US007652993B2

(12) United States Patent
van Beek

(10) Patent No.: US 7,652,993 B2
(45) Date of Patent: Jan. 26, 2010

(54) MULTI-STREAM PRO-ACTIVE RATE ADAPTATION FOR ROBUST VIDEO TRANSMISSION

(75) Inventor: Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 435 days.

(21) Appl. No.: 11/592,906

(22) Filed: Nov. 3, 2006

(65) Prior Publication Data

US 2008/0107173 A1 May 8, 2008

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/28 | (2006.01) |
| H04L 12/56 | (2006.01) |
| H04B 1/66 | (2006.01) |
| H04N 7/12 | (2006.01) |
| H04N 11/02 | (2006.01) |
| H04N 11/04 | (2006.01) |
| H04N 7/173 | (2006.01) |

(52) U.S. Cl. .................... 370/231; 370/252; 370/390; 375/240.02; 725/95

(58) Field of Classification Search ............ 375/240.02, 375/240.26; 370/230, 230.1, 231–235, 468, 370/395.64, 395.65, 252; 725/95
See application file for complete search history.

(56) References Cited

U.S. PATENT DOCUMENTS

| | | | |
|---|---|---|---|
| 5,159,447 | A | 10/1992 | Haskell et al. |
| 5,506,686 | A | 4/1996 | Auyeung et al. |
| 5,541,852 | A | 7/1996 | Eyuboglu et al. |
| 5,546,377 | A | 8/1996 | Ozveren |
| 5,606,369 | A | 2/1997 | Keesman et al. |
| 5,805,220 | A | 9/1998 | Keesman et al. |
| 5,936,940 | A | 8/1999 | Marin et al. |
| 5,978,236 | A | 11/1999 | Faberman et al. |

(Continued)

FOREIGN PATENT DOCUMENTS

EP     1 026 855     6/2000

(Continued)

OTHER PUBLICATIONS

"IEEE Wireless LAN Edition: A compilation based on IEEE Std 802.11—1999 (R2003) and its amendments," IEEE Standards Information Network, IEEE Press, Copyright 2003.

(Continued)

*Primary Examiner*—Ayaz R Sheikh
*Assistant Examiner*—Hoang-Chuong Q Vu
(74) *Attorney, Agent, or Firm*—Chernoff, Vilhauer, McClung & Stenzel

(57) ABSTRACT

A method for transmitting data streams from a transmitter to a plurality of receivers over a shared channel that includes a transmitter simultaneously transmitting a plurality of the data streams to the plurality of receivers of the shared channel. The method includes jointly adapting bit rates of the respective data streams being transmitted in accordance with the available bandwidth, a general target time, and a quality measure.

21 Claims, 7 Drawing Sheets

U.S. PATENT DOCUMENTS

| | | | |
|---|---|---|---|
| 5,982,778 | A | 11/1999 | Mangin et al. |
| 5,995,705 | A | 11/1999 | Lang |
| 6,014,694 | A | 1/2000 | Aharoni et al. |
| 6,049,549 | A | 4/2000 | Ganz et al. |
| 6,055,578 | A | 4/2000 | Williams et al. |
| 6,167,084 | A | 12/2000 | Wang et al. |
| 6,167,253 | A | 12/2000 | Farris et al. |
| 6,233,226 | B1 | 5/2001 | Gringeri et al. |
| 6,263,503 | B1 | 7/2001 | Margulis et al. |
| 6,275,497 | B1 | 8/2001 | Varma et al. |
| 6,275,531 | B1 | 8/2001 | Li |
| 6,292,834 | B1 | 9/2001 | Ravi et al. |
| 6,300,665 | B1 | 10/2001 | Peeters et al. |
| 6,310,495 | B1 | 10/2001 | Zhang |
| 6,343,085 | B1 | 1/2002 | Krishnan et al. |
| 6,351,153 | B1 | 2/2002 | Fischer |
| 6,363,056 | B1 | 3/2002 | Beigi et al. |
| 6,377,624 | B1 | 4/2002 | Keesman |
| 6,434,606 | B1 | 8/2002 | Borella et al. |
| 6,456,591 | B1 | 9/2002 | Mishra |
| 6,459,811 | B1 | 10/2002 | Hurst, Jr. |
| 6,542,467 | B2 | 4/2003 | Umayabashi |
| 6,587,875 | B1 | 7/2003 | Ogus |
| 6,590,936 | B1 | 7/2003 | Kadono |
| 6,598,228 | B2 | 7/2003 | Hejna |
| 6,665,751 | B1 | 12/2003 | Chen et al. |
| 6,700,869 | B1 | 3/2004 | Falco et al. |
| 6,741,565 | B1 | 5/2004 | Wicklund |
| 6,747,991 | B1 | 6/2004 | Hemy et al. |
| 6,988,144 | B1 | 1/2006 | Luken et al. |
| 2001/0047423 | A1 | 11/2001 | Shao et al. |
| 2002/0010938 | A1* | 1/2002 | Zhang et al. ................ 725/95 |
| 2002/0054578 | A1 | 5/2002 | Zhang et al. |
| 2002/0075857 | A1 | 6/2002 | LeBlanc |
| 2002/0085587 | A1 | 7/2002 | Mascolo |
| 2002/0101880 | A1 | 8/2002 | Kim |
| 2002/0114393 | A1* | 8/2002 | Vleeschouwer ........ 375/240.16 |
| 2002/0126891 | A1 | 9/2002 | Osberger |
| 2002/0136298 | A1* | 9/2002 | Anantharamu et al. . 375/240.12 |
| 2002/0140851 | A1 | 10/2002 | Laksono |
| 2002/0169880 | A1 | 11/2002 | Loguinov et al. |
| 2002/0186660 | A1 | 12/2002 | Bahadiroglu |
| 2003/0016630 | A1 | 1/2003 | Vega-Garcia et al. |
| 2003/0035133 | A1 | 2/2003 | Berkema et al. |
| 2003/0067872 | A1 | 4/2003 | Harrell et al. |
| 2003/0067877 | A1 | 4/2003 | Sivakumar et al. |
| 2003/0095594 | A1 | 5/2003 | Laksono et al. |
| 2003/0101274 | A1 | 5/2003 | Yi et al. |
| 2003/0152032 | A1 | 8/2003 | Yanagihara et al. |
| 2003/0189589 | A1 | 10/2003 | LeBlanc et al. |
| 2004/0017773 | A1 | 1/2004 | Piche et al. |
| 2004/0045030 | A1 | 3/2004 | Reynolds et al. |
| 2004/0057381 | A1 | 3/2004 | Tseng et al. |
| 2004/0062182 | A1 | 4/2004 | Pietruszynski et al. |
| 2004/0071096 | A1 | 4/2004 | Na et al. |
| 2004/0086268 | A1 | 5/2004 | Radha et al. |
| 2004/0153951 | A1 | 8/2004 | Walker et al. |
| 2004/0170186 | A1 | 9/2004 | Shao et al. |
| 2004/0190515 | A1* | 9/2004 | Nogima et al. .............. 370/392 |
| 2004/0204041 | A1 | 10/2004 | Fillebrown et al. |
| 2004/0252759 | A1 | 12/2004 | Winder et al. |
| 2004/0255328 | A1 | 12/2004 | Baldwin et al. |
| 2005/0007956 | A1 | 1/2005 | Nilsson et al. |
| 2005/0041689 | A1 | 2/2005 | Wu et al. |
| 2005/0055201 | A1 | 3/2005 | Florencio et al. |
| 2005/0094622 | A1 | 5/2005 | Mallila |
| 2005/0105469 | A1 | 5/2005 | Hao |
| 2005/0152465 | A1 | 7/2005 | Maltsev et al. |
| 2005/0169174 | A1 | 8/2005 | Apostolopoulos et al. |
| 2005/0195821 | A1 | 9/2005 | Yun et al. |
| 2005/0213502 | A1* | 9/2005 | Convertino et al. ......... 370/229 |
| 2005/0216950 | A1* | 9/2005 | MacInnis .................... 725/135 |
| 2006/0045020 | A1 | 3/2006 | Picco et al. |
| 2006/0077993 | A1 | 4/2006 | Pereira et al. |
| 2006/0165166 | A1* | 7/2006 | Chou et al. ............ 375/240.05 |
| 2006/0198392 | A1 | 9/2006 | Park et al. |
| 2007/0263657 | A1 | 11/2007 | Sugar et al. |
| 2008/0259792 | A1 | 10/2008 | Cimini et al. |

FOREIGN PATENT DOCUMENTS

| | | |
|---|---|---|
| EP | 1 047 223 A2 | 10/2000 |
| EP | 1 047 223 A3 | 2/2001 |
| EP | 1 179 925 A2 | 2/2002 |
| EP | 0 699 368 | 7/2002 |
| EP | 1300046 | 4/2003 |
| EP | 1 179 925 A3 | 8/2003 |
| EP | 1536582 | 6/2005 |
| GB | 2 367 219 A | 3/2002 |
| JP | 6-338918 | 12/1994 |
| JP | 2001-223716 | 8/2001 |
| JP | 2003-008487 | 1/2003 |
| JP | 2003-204342 | 7/2003 |
| WO | WO 01/39508 | 5/2001 |
| WO | WO 02/03609 A2 | 1/2002 |
| WO | WO 02/03609 A3 | 1/2002 |
| WO | WO 02/087276 A2 | 10/2002 |
| WO | WO 02/087276 A3 | 10/2002 |
| WO | WO 02/101513 | 12/2002 |
| WO | WO 03/003630 | 1/2003 |
| WO | WO 03/009581 | 1/2003 |
| WO | WO 03/032643 | 4/2003 |
| WO | WO 03/075021 | 9/2003 |
| WO | WO 03/096698 | 11/2003 |
| WO | WO 2004/062291 | 7/2004 |

OTHER PUBLICATIONS

Draft Amendment to IEEE Std. 802.11 (1999 Edition), Part 11: MAC and PHY specifications: Medium Access Control (MAC) Quality of Service (QoS) Enhancements, IEEE P802.11e/D8.0, Feb. 2004.

Peter Van Beek, et al., "Adaptive streaming of high-quality video over wireless LANs," Visual communications and Image Processing 2004, Proc. Of SPIE-IS&T Electronics Imaging, SPIE vol. 5308, 2004, pp. 647-660.

Jun Xin et al., "Bit allocation for Joint Transcoding of Multiple MPEG Coded Video Streams," Department of Electrical Engineering, University of Washington, Box 352500, Seattle, WA 98195, 4 pages, date unknown.

Limin Wang and Andre Vincent, "Bit allocation and Contraints for Joint Coding of Multiple Video Programs," IEEE Transactions on Circuits and Systems for video Technology, vol. 9, No. 6, Sep. 1999, pp. 949-959.

Sergio D. Servetto and Klara Nahrstedt, "Broadcast Quality video over IP," IEEE Transactions on Multimedia, vol. 3, No. 1, Mar. 2001, pp. 162-173.

Bernd Girod and Niko Farber, "Chapter 12: Wireless Video," Compressed video Over Networks, Nov. 14, 1999, Telecommunications laboratory, University of Erlangen-Nuremberg, Cauerstrasse 7, 91058 Erlangen, Germany, pp. 1-38.

Amy R. Reibman and Barry G. Haskell, "Constraints on Variable Bit-Rate Video for ATM Networks," IEEE Transactions on circuits and Systems for Video Technology, vol. 2, No. 4, Dec. 1992, pp. 361-372.

Arunchandar Vasan and A. Udaya Shankar, "An Empirical Characterization of Instantaneous Throughput in 802.11b WLANs," Department of computer Science and UMIACS, University of Mayland, college Park, MD 20742, 6 pages.

Jean-Chrysostome Bolot and Thierry Turletti, "A rate control mechanism for packet video in the Internet," INRIA, B. P. 93, 06902 Sophia-Antipolis Cedex, France, 8 pages.

Vern Paxson, "End-to-End Internet Packet Dynamics," Network Research Group, Lawrence Berkeley National laboratory, University of California, Berkeley, Jun. 23, 1997, 17 pages.

J-C Bolot and T. Turletti, "Experience with Control Mechanisms for Packet Video in the Internet," INRIA, 2004, route des Lucioles, 06902 Sophia Antipolis Cedex, France, 12 pages, date unknown.

Daji Qiao, et al., "Goodput Analysis and Link Adaptation for IEEE 802.11a Wireless LANs," IEEE Transactions on Mobile Computing, vol. 1, No. 4, Oct.-Dec. 2002, pp. 278-292.

Steve Gardner, et al., "HomePlug Standard Brings Networking to the Home," CSD Dec. 2000: Feature: HomePlug Standard Brings Networking to the Home, http://www.commsdesign.com/main/2000/12/0012feat5.htm, 9 pages.

Bob O'Hara and Al Petrick, "IEEE 802.11 Handbook: A Designer's Companion," Published by Standards Information Network, IEEE Press, The Institute of Electrical and Electronics Engineers, Inc., 174 pages. Copyright 2001.

Draft "Test Model 5," Test Model Editing Committee, ISO-IEC/JTC1/SC29/WG11/N0400, Coded Representation of Picture and Audio Information, Apr. 1993, Telecommunication Standardization Sector Study Group 15, Experts Group for ATM video Coding.

James C. Chen, Ph.D., Measured Performance of 5-GHz 802.11a Wireless LAN Systems, Aug. 27, 2001, Atheros Communications, Inc., 11 pages.

Kevin Lai and Mary Baker, "Measuring Bandwidth," Jul. 15, 1998, 25 pages, laik@cs.stanford.edu and mgbaker@cs.stanford.edu.

Chi-Yuan Hsu, et al., "Rate Control for Robust Video Transmission over Burst-Error Wireless Channels," IEEE Journal on Selected Areas in Communications, vol. 17, No. 5, May 1999, pp. 1-18.

Philip A. Chou and Zhourong Miao, "Rate-Distortion Optimized Streaming of Packetized Media," Submitted to IEEE Transactions on Multimedia, Feb. 2001, pp. 1-20.

Dmitri Loguinov and Hayder Radha, "Video Receiver Based Real-Time Estimation of channel Capacity," IEEE ICIP 2002, pp. III-213-III-216.

Wendell Smith, "Wireless Video White Paper," ViXS Systems Inc., ViXS Confidential, Jan. 9, 2002, 15 pages.

James F. Kurose and Keith W. Ross, "Computer Networking: A Top-Down Approach Featuring the Internet," Copyright 2001 by Addison Wesley Longman, Inc.

M. Kalman, E. Steinbach, and B. Girod, "Adaptive Media Playout for Low-Delay video Streaming Over Error-Prone Channels," IEEE Transactions on Circuits and Systems for Video Technology, vol. 14, No. 6, Jun. 2004, pp. 841-851.

R. Ramjee, J. Kurose, D. Towsley, and H. Schulzrinne, "Adaptive Playout Mechanisms for Packetized Audio Applications in Wide-Area Networks," IEEE Infocom, Toronto, Canada, Jun. 1994, 9 pages.

M. Kalman, E. Steinbach, and B. Girod, "Adaptive Playout for Real-Time Media Streaming," Proc. IEEE International Symposium on Circuits and Systems, ISCAS-2002, Scottsdale, AZ, May 2002, 4 pages.

International Search Report for PCT/US 06/36433 mailed Apr. 27, 2007.

M. Kalman, B. Giron and P. Van Beek, "Optimized transcoding rate selection and packet scheduling for transmitting multiple video streams over a shared channel," IEEE Int. Conference on Image Processing (ICIP 2005), Genova, Italy, Sep. 2005, 4 pages.

K. Stuhlmuller, N. Farber, M. Link and B. Girod, "Analysis of video transmission over lossy channels," IEEE Journal on Selected Areas in Communications, vol. 18, No. 6, Jun. 2000, pp. 1012-1032.

S. Aramvith, I-M. Pao and M.-T. Sun, "A rate control scheme for video transport over wireless channels," IEEE Trans. On Circuits and Systems for Video Technology, vol. 11, No. 5, May 2001.

* cited by examiner

MULTI-STREAM PRO-ACTIVE RATE ADAPTATION FOR ROBUST VIDEO TRANSMISSION

CROSS-REFERENCE TO RELATED APPLICATIONS

Not applicable.

BACKGROUND OF THE INVENTION

The present invention relates generally to wireless transmission systems, and relates more particularly to a wireless video transmission system.

Developing an effective method for implementing enhanced television systems is a significant consideration for contemporary television designers and manufacturers. In conventional television systems, a display device may be utilized to view program information received from a program source. The conventional display device is typically positioned in a stationary location because of restrictions imposed by various physical connections that electrically couple the display device to input devices, output devices, and operating power. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

However, portable television systems typically possess certain detrimental operational characteristics that diminish their effectiveness for use in modern television systems. For example, in order to eliminate restrictive physical connections, portable televisions typically receive television signals that are propagated from a remote terrestrial television transmitter to an antenna that is integral with the portable television. Because of the size and positioning constraints associated with a portable antenna, such portable televisions typically exhibit relatively poor reception characteristics, and the subsequent display of the transmitted television signals is therefore often of inadequate quality.

Other factors and considerations are also relevant to effectively implementing an enhanced wireless television system. For example, the evolution of digital data network technology and wireless digital transmission techniques may provide additional flexibility and increased quality to portable television systems. However, current wireless data networks typically are not optimized for flexible transmission and reception of video information.

Furthermore, a significant proliferation in the number of potential program sources (both analog and digital) may benefit a system user by providing an abundance of program material for selective viewing. In particular, an economical wireless television system for flexible home use may enable television viewers to significantly improve their television-viewing experience by facilitating portability while simultaneously providing an increased number of program source selections.

However, because of the substantially increased system complexity, such an enhanced wireless television system may require additional resources for effectively managing the control and interaction of various system components and functionalities. Therefore, for all the foregoing reasons, developing an effective method for implementing enhanced television systems remains a significant consideration for designers and manufacturers of contemporary television systems.

A number of media playback systems use continuous media streams, such as video image streams, to output media content. However, some continuous media streams in their raw form often require high transmission rates, or bandwidth, for effective and/or timely transmission. In many cases, the cost and/or effort of providing the required transmission rate is prohibitive. This transmission rate problem is often solved by compression schemes that take advantage of the continuity in content to create highly packed data. Compression methods such Motion Picture Experts Group (MPEG) methods and its variants for video are well known. MPEG and similar variants use motion estimation of blocks of images between frames to perform this compression. With extremely high resolutions, such as the resolution of 1080i used in high definition television (HDTV), the data transmission rate of such a video image stream will be very high even after compression.

One problem posed by such a high data transmission rate is data storage. Recording or saving high resolution video image streams for any reasonable length of time requires considerably large amounts of storage that can be prohibitively expensive. Another problem presented by a high data transmission rate is that many output devices are incapable of handling the transmission. For example, display systems that can be used to view video image streams having a lower resolution may not be capable of displaying such a high resolution. Yet another problem is the transmission of continuous media in networks with a limited bandwidth or capacity. For example, in a local area network with multiple receiving/output devices, such a network will often have a limited bandwidth or capacity, and hence be physically and/or logistically incapable of simultaneously supporting multiple receiving/output devices.

The network may include interconnections based on wired (for example Ethernet), wireless (for example IEEE 802.11) or power-line (for example HomePlug based) links. The available bandwidth of such interconnections may be limited, may vary over time, and may be unpredictable. Transmission of compressed audio/video streams over such interconnections may be further complicated by the stringent delay constraints on delivery of the audio/video data. The maximum end-to-end delay may have to be limited to up to a few seconds, and the startup delay perceived by the user may have to be limited further. The system may require transmission of stored audio/video streams, and may require transmission of live audio/video streams.

DETAILED DESCRIPTION OF PREFERRED EMBODIMENT

Figure 1:
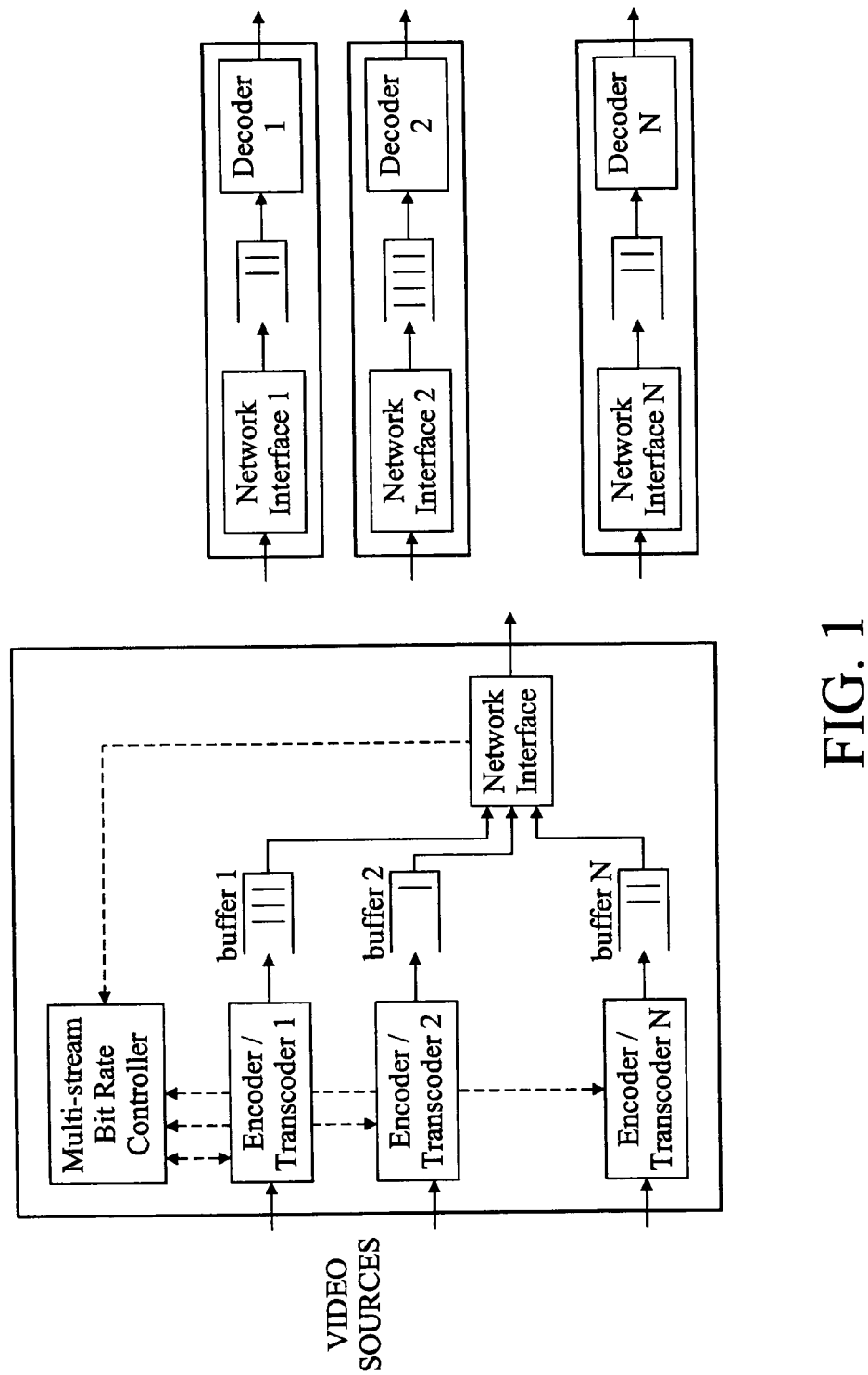
FIG. 1 illustrates a transmission system with a transmitter and multiple receivers.

The system may involve transmission of multiple video streams from a single video server to multiple clients over a shared channel. The system may include video encoders or video transcoders at the server, to adapt the bit rate of the video streams to the varying channel conditions and resource constraints. The channel may be a wireless channel, were the available transmission time should be shared between multiple clients.

Delay-constrained bit rate adaptation methods utilize buffering at both the server and client to manage the flow of video data across the channel. These methods utilize buffers to absorb variations in channel bandwidth and variations in the video streams, while ensuring that the video data is delivered to the clients on time. Furthermore, an important goal is to optimize the overall quality across all video streams.

In single-stream delay-constrained bit rate adaptation, it is desirable to transmit a segment of video data across a channel with limited bandwidth such that all video data in the segment is delivered on time. The time that the video data must be delivered for proper decoding and rendering is the delivery deadline $s_{deadline}$. The system may assign a target delivery time for the segment of video data, denoted by $s_{target}$. Preferably, the target delivery time is chosen to occur before the actual delivery deadline on the time-line. This will result in a certain amount of video data being buffered at the receiver before decoding and rendering. Such buffering is desirable because the system may not be able to predict or estimate the actual bandwidth of the channel perfectly, and because the system may inherently need some time to react to changes in the channel bandwidth over time. The closeness of the target delivery time to the delivery deadline time may be controlled by a delay target factor (also called deadline sensitivity factor) $\Omega$. The delay target factor can also be understood to control the fullness of the sender transmission buffer, or the time delay incurred by video data in the sender buffer(s). The time available for transmitting the video segment across the channel is the interval between the target delivery time and the current time $s_{now}$.

The system considers a segment of video data consisting of a block or sequence of video frames of length L. This sequence may correspond to a single frame (L=1) or multiple video frames (L>1). The first frame in this sequence is the next frame to be encoded or transcoded before transmission over the channel, frame i. The last frame in this sequence is frame i+L−1. This sequence of frames may for example correspond to one or multiple MPEG GOPs, but does not have to.

The system may select an appropriate number of bits to allocate to the segment of video data consisting of frames i, i+1, ..., i+L−1. In addition, the system may select an appropriate amount of bits to allocate to the next frame to be encoded, frame i. This frame is then encoded or transcoded using the calculated amount of bits as the target, and subsequently, the system considers the next sequence of video frames of length L, starting at frame i+1. The amount of bits used to encode frame i is denoted by $r_i$.

When allocating an optimal number of bits to a segment of video data, the system also considers that an amount of video data may be stored in buffers or queues at the sender or in the network, which represents video frames that have already been encoded or transcoded but have not arrived at the receiver yet. This amount of video data corresponds to the sequence of video frames k, k+1, ..., i−1.

The system may use past measurements of throughput or bandwidth to generate a prediction of channel bandwidth H available for transmission of video. This may include computing the expected bandwidth. Also, this may be based on a statistical channel model. The system may utilize further statistical information characterizing the channel, such as the variance of the bandwidth.

Let $\Delta s$ be the difference between the target delivery time and the current time. This difference may depend on the following parameters, for example:
the end to end delay between time of encoding and time of decoding $\Delta T_E$
the delay target factor $\Omega$
the number of video frames in the segment of video data L
the frame duration $\Delta T$
For example $\Delta s$ be may determined as: $\Delta s = \Omega \cdot \Delta T_E + (L-1) \cdot \Delta T$.

In single-stream delay-constrained bit rate adaptation, the system may assign an amount of bits to the segment of video data consisting of frames i, i+1, ..., i+L−1 such that the data is expected to be delivered by the target delivery time. This can be expressed by the following constraint:

$$\left( \sum_{j=k}^{i-1} r_j + \sum_{j=i}^{i+L-1} r_j \right) \cdot \frac{1}{H} = \Delta s$$

The first term on the left corresponds to the video frames that have already been encoded or transcoded and are in the sender buffer(s), waiting to be transmitted, or in other buffers in the network, at the current time. It is assumed that this amount of bits for these frames cannot be changed anymore by bit rate reduction (bit rate adaptation) at the current time. This amount of bits can only be reduced by removing packets or coded frames from the sender buffer(s). The second term on the left corresponds to the video frames that are still to be encoded or transcoded, and the target amount of bits to use during encoding or transcoding is to be determined. In the following, the first term on the left is referred to as the backlog B. Replacing that term by B and re-arranging results in:

$$\sum_{j=i}^{i+L-1} r_j = H \cdot \Delta s - B \qquad (1)$$

The bits may be allocated to individual frames in the segment (block of frames), given Eq. 1, in any suitable manner.

Multi-Stream Pro-Active Delay-Constrained Bit Rate Adaptation Framework

Referring to FIG. 1, a multi-stream system considers transmission of multiple video streams n, n=1, 2, ..., N. The number of streams being transmitted simultaneously is N. The system associates a channel utilization factor $f_n$ with each stream n, which expresses the fraction of the time that data from stream n is being transmitted over the shared channel. The system also considers the total fraction of the time $\Phi$ that will be available for transmission of the data from all N streams. This total fraction may be set to 1.0, or may be set smaller than 1.0 to allow for imperfect prediction of the channel bandwidth, or to account for other, non-video, channel traffic. Therefore, one constraint on the system may be the following:

$$\sum_{n=1}^{N} f_n \le \Phi \le 1.0 \qquad (2)$$

The multi-stream system utilizes a delay constraint for each individual stream. Therefore, one may replace Eq. 1 with the following N constraints:

$$\sum_{j=i}^{i+L-1} r_{n,j} = f_n \cdot H_n \cdot \Delta s_n - B_n \qquad (3)$$

$$n = 1, 2, \ldots, N.$$

Here, $r_{n,j}$ corresponds to the amount of bits used to encode frame j of stream n. The backlog may be different for different streams; hence, $B_n$ denotes the backlog for stream n. The target delivery time may also be different for different streams; hence, $\Delta s_n$ denotes the time available until the target delivery time for stream n. The bandwidth available for different streams on the shared channel may also be different for different streams; hence, $H_n$ denotes the expected (predicted) bandwidth available for stream n. The first term on the right now includes the channel utilization fraction $f_n$ to take into account that the available transmission time on the channel must be shared between the different streams.

The system takes into account the individual amounts of backlog in the buffer at the sender (server) for each stream ($B_n$), as well as the individual time intervals from the current time to the target delivery time of data for each particular stream ($\Delta s_n$), as illustrated by the constraints in Eq. 3. Therefore, the system is able to adapt to the different characteristics of different links (between the server and different clients), for example by setting different delay target factors $\Omega_n$ for different streams. This is similar to adaptively controlling the fullness of the transmission buffers for different streams in the system. Furthermore, the system is able to adapt to potentially differing characteristics of the receivers, for example in terms of buffering capabilities. In particular, different receivers may utilize a different end-to-end delay value $\Delta T_E$.

This multi-stream video transmission system will aim to deliver the video data from individual streams to their individual receivers on time (without buffer underflows), while at the same time optimizing the coded video quality of all streams jointly. The latter optimization over all streams will be described in the following.

Multi-Stream Quality-Optimized Pro-Active Rate Adaptation Based on 1-Parameter Rate-Distortion Model A 1-parameter rate-distortion model relates the amount of bits used to encode a video frame to the quantization level, through the use of a parameter that measures the so-called coding complexity. For frame j of stream n, this relation is expressed by:

$$r_{n,j} = \frac{C_{n,j}}{Q_{n,j}}$$

where $C_{n,j}$ is the complexity parameter and $Q_{n,j}$ is the quantization level for the frame. It is assumed that the complexity parameters for frames to be encoded or transcoded can be predicted, based on observed values in the recent past.

Furthermore, the system aims to maximize the minimum quality over all video streams. This optimal state occurs when the quantization levels of all video frames across all streams are equal to the same value, up to a constant that takes into account the difference between I, P and B frames. This is expressed by modifying the above relation as follows:

$$r_{n,j} = \frac{C_{n,j}}{K_{n,j} \cdot Q}$$

where the constants $K_{n,j}$ are known, and Q is the unknown quantization level.

The above expression can be substituted for $r_{n,j}$ in Eq. 3. The resulting expression can be combined with the multi-stream constraint in Eq. 2 to obtain a closed-form expression for the unknown channel utilization fractions $f_n$ given all other parameters. The optimal channel utilization fractions are determined by:

$$f_n = \frac{\frac{1}{H_n \cdot \Delta s_n} \sum_{j=i}^{i+L-1} \frac{C_{n,j}}{K_{n,j}}}{\sum_{m=1}^{N} \frac{1}{H_m \cdot \Delta s_m} \sum_{j=i}^{i+L-1} \frac{C_{m,j}}{K_{m,j}}} \left( \Phi - \sum_{m=1}^{N} \frac{B_m}{H_m \cdot \Delta s_m} \right) + \frac{B_n}{H_n \cdot \Delta s_n} \qquad (4)$$

$$n = 1, 2, \ldots, N.$$

Also, the bit rate for stream n, $R_n$, that is allocated for the video segment containing frames i, i+1, ..., i+L−1, can be determined by:

$$R_n = \qquad (5)$$

$$\frac{1}{L \cdot \Delta T} \cdot \sum_{j=i}^{i+L-1} r_{n,j} = \frac{\frac{1}{L \cdot \Delta T} \sum_{j=i}^{i+L-1} \frac{C_{n,j}}{K_{n,j}}}{\sum_{m=1}^{N} \frac{1}{H_m \cdot \Delta s_m} \sum_{j=i}^{i+L-1} \frac{C_{m,j}}{K_{m,j}}} \left( \Phi - \sum_{m=1}^{N} \frac{B_m}{H_m \cdot \Delta s_m} \right)$$

$$n = 1, 2, \ldots, N.$$

This can be generalized further to include weights expressing the relative importance of different streams, where the weights influence the relative video quality received for different streams.

Following the allocation of a rate, or equivalently, an amount of bits to a segment of video data of every stream, other techniques can be utilized to determine an appropriate amount of bits to allocate to different frames within the segment of each specific stream. If the video segments under consideration each contain only one frame (L=1), the above equations determine the rate or amount of bits allocated to that frame directly.

Multi-Stream Quality-Optimized Pro-Active Rate Adaptation Based on 3-Parameter Rate-Distortion Model The multi-stream quality-optimizing rate allocation may be based on a 3-parameter rate-distortion model described such that individual streams are allocated bits ensuring on time delivery and avoiding buffer underflow at the receivers. The 3-parameter rate-distortion model, relates the average mean-square-error distortion $D_n$ of stream n to the video bit rate $R_n$ of stream n, through the use of three parameters $D_{n,0}$, $R_{n,0}$ and $\theta_n$. For video stream n, this relation is expressed by:

$$D_n(R_n) = D_{0,n} + \frac{\theta_n}{(R_n - R_{0,n})}$$

In the following, it is assumed that the rate-distortion parameters for future segments of video streams to be encoded or transcoded can be predicted, based on observed values in the recent past.

From Eq. 3, we obtain an expression of the bit rate of the segment of video stream n to be encoded as follows:

$$R_n = \frac{1}{L \cdot \Delta T} \cdot \sum_{j=i}^{i+L-1} r_{n,j} = \frac{1}{L \cdot \Delta T} \cdot (f_n \cdot H_n \cdot \Delta s_n - B_n) \quad (6)$$

This expression for the video bit rate for stream n can be substituted into the above rate-distortion expression. Subsequently, optimal channel utilization fractions and optimal bit rates can be found by minimizing a measure of the overall distortion across all N streams:

minimize $$\sum_{n=1}^{N} w_n \cdot D_n(R_n)$$

subject to the constraint in Eq. 2.

The system utilizes weights $w_n$ expressing the relative importance of different streams, where the weights influence the relative video quality received for different streams. A closed-form solution can be found using the method of Lagrange multipliers. It can be shown that the optimal channel utilization fractions are given by:

$$f_n = \frac{\sqrt{\frac{w_n \cdot \theta_n}{H_n \cdot \Delta s_n}}}{\sum_{m=1}^{N}\sqrt{\frac{w_m \cdot \theta_m}{H_m \cdot \Delta s_m}}} \left( \Phi - \sum_{m=1}^{N} \frac{B_m + L \cdot \Delta T \cdot R_{0,m}}{H_m \cdot \Delta s_m} \right) + \frac{B_n + L \cdot \Delta T \cdot R_{0,n}}{H_n \cdot \Delta s_n} \quad (7)$$

$n = 1, 2, \ldots, N.$

Also, the bit rate for stream n, $R_n$, that is allocated for the video segment containing frames i, i+1, ..., i+L−1, can be determined by:

$$R_n = \frac{H_n \cdot \Delta s_n}{L \cdot \Delta T} \cdot \frac{\sqrt{\frac{w_n \cdot \theta_n}{H_n \cdot \Delta s_n}}}{\sum_{m=1}^{N}\sqrt{\frac{w_m \cdot \theta_m}{H_m \cdot \Delta s_m}}} \left( \Phi - \sum_{m=1}^{N} \frac{B_m + L \cdot \Delta T \cdot R_{0,m}}{H_m \cdot \Delta s_m} \right) + R_{0,n} \quad (8)$$

$n = 1, 2, \ldots, N.$

Following the allocation of a rate, or equivalently, an amount of bits to a segment of video data of every stream, other techniques can be utilized to determine an appropriate amount of bits to allocate to different frames within the segment of each specific stream. If the video segments under consideration each contain only one frame (L=1), the above equations determine the rate or amount of bits allocated to that frame directly.

Multi-Stream Pro-Active Bit Rate Adaptation and Packet Scheduling

Figure 2:
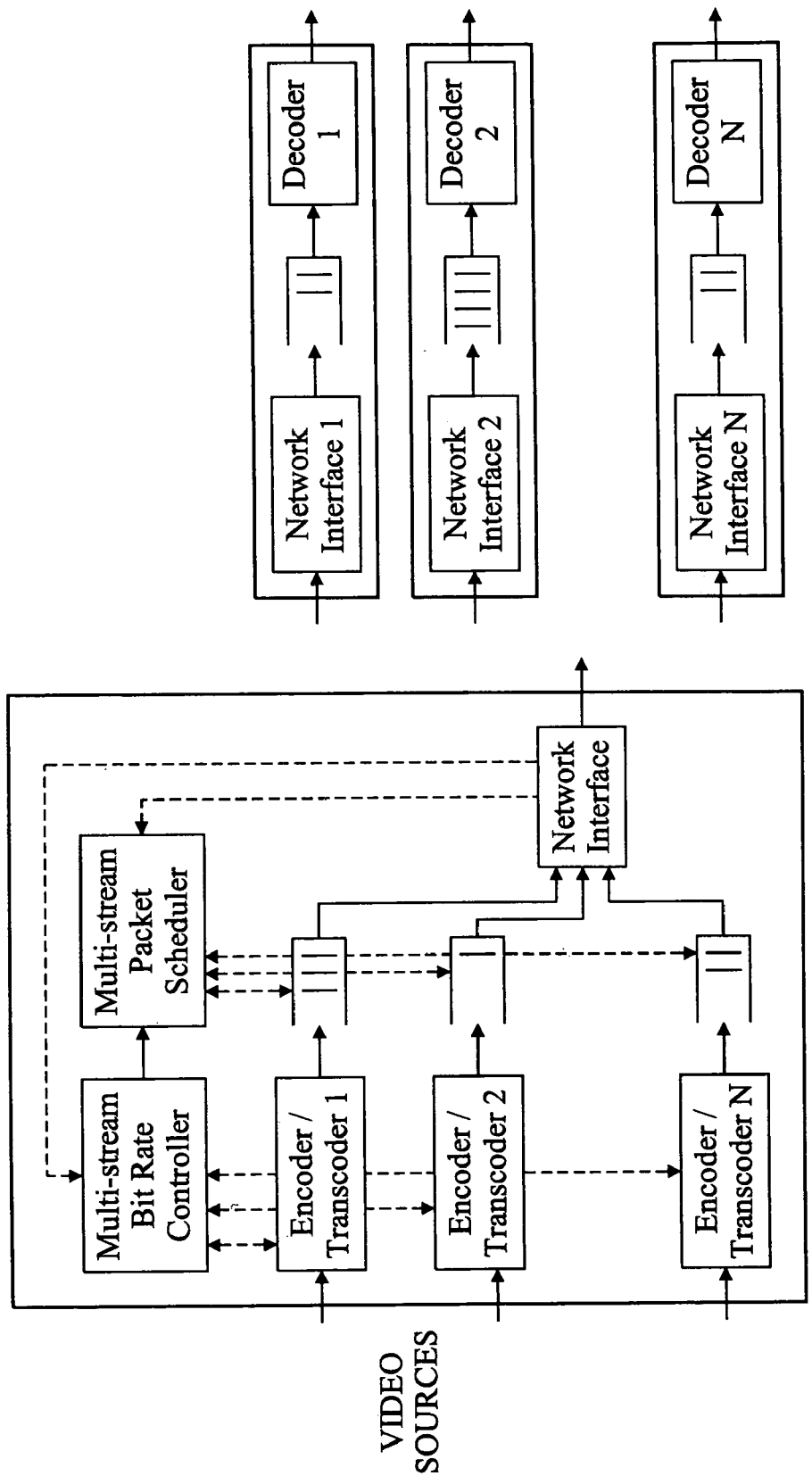
FIG. 2 illustrates a transmission system with a transmitter with a scheduler and multiple receivers.

Referring to FIG. 2, a video streaming system may include a multi-stream packet scheduling module (in addition to the multi-stream bit rate adaptation module). Such a packet scheduling module can be used to selectively schedule packets from the different sender buffers for transmission.

The multi-stream rate adaptation may include packet scheduling. It can be seen from Eq. 3, Eq. 4 and Eq. 7 above that in certain conditions it may not be possible to compute a feasible solution given the various constraints. This could happen when the amount of backlog data $B_n$ is too large, relative to the available bandwidth $H_n$ and time interval until the target delivery time. For example, in Eq. 4 it is required that $$\sum_{m=1}^{N} \frac{B_m}{H_m \cdot \Delta s_m} \leq \Phi.$$

Furthermore, the system may utilize a minimum video rate for each stream $R_{min,n}$. Such a minimum video bit rate presents an additional constraint for each video stream.

To be able to enforce a minimum video bit rate, and to prevent the above-mentioned backlog data problem, the multi-stream bit rate control module can invoke the multi-stream packet scheduling module under certain conditions. In those conditions, the bit rate controller will request the packet scheduler to reduce the amount of data held in the sender buffers, by selectively removing packets before transmission.

In particular, the packet scheduling module may be invoked when the following condition holds:

$$\sum_{m=1}^{N} \frac{B_m + L \cdot \Delta T \cdot R_{min,m}}{H_m \cdot \Delta s_m} \geq \Phi_{threshold},$$

where $\Phi_{threshold}$ is a threshold parameter, with $\Phi_{threshold} \leq \Phi$.

Example Performance

Figure 3A:
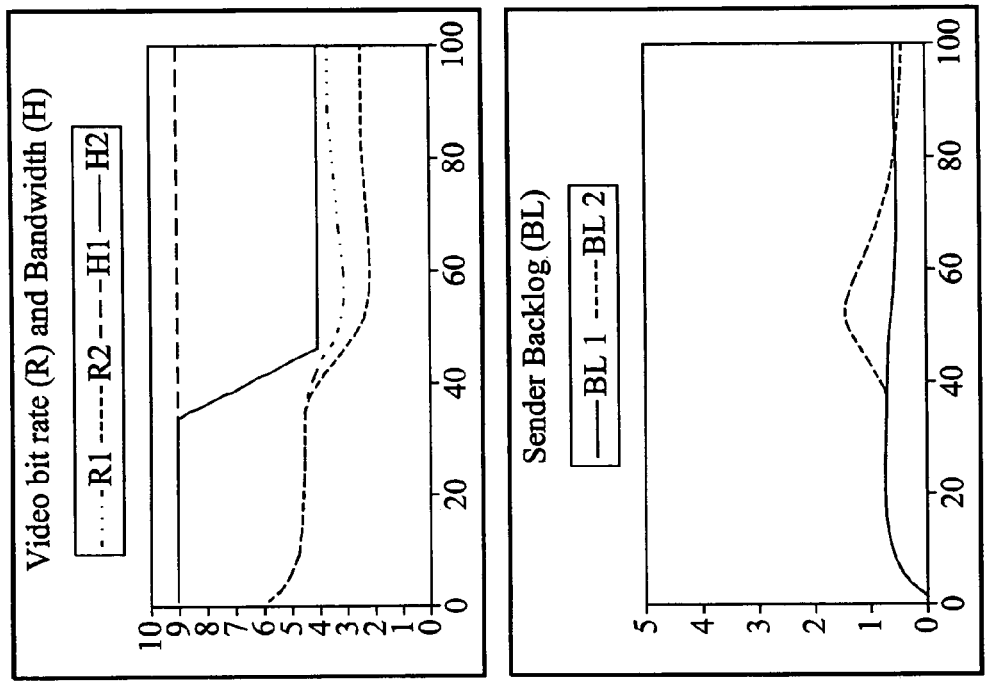
FIGS. 3A-3B illustrate delay constrained examples.
Figure 3A:
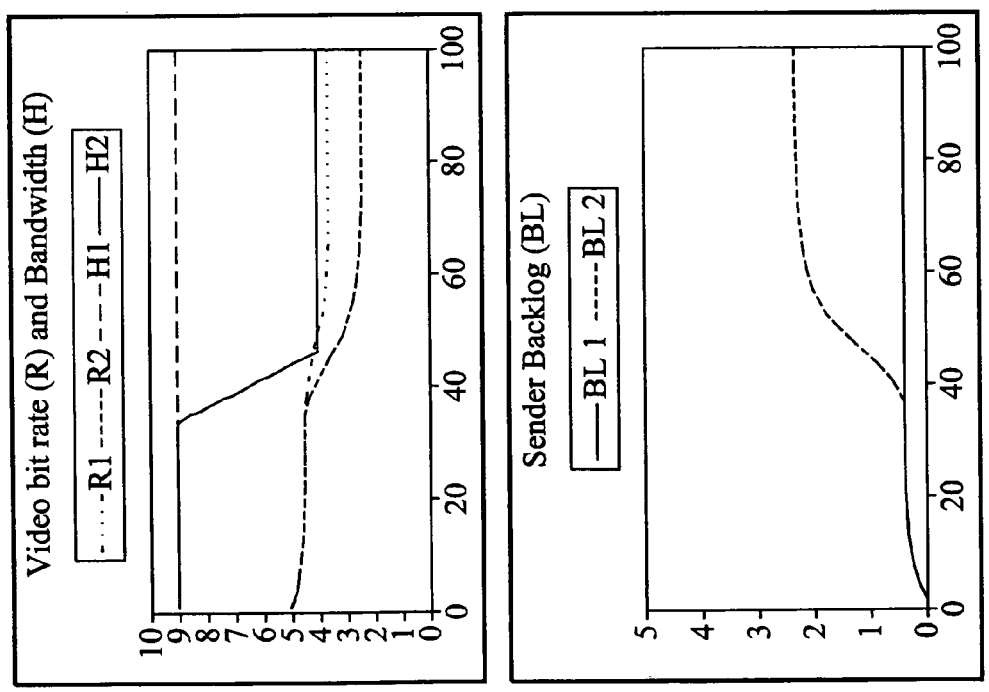
Figure 3B:
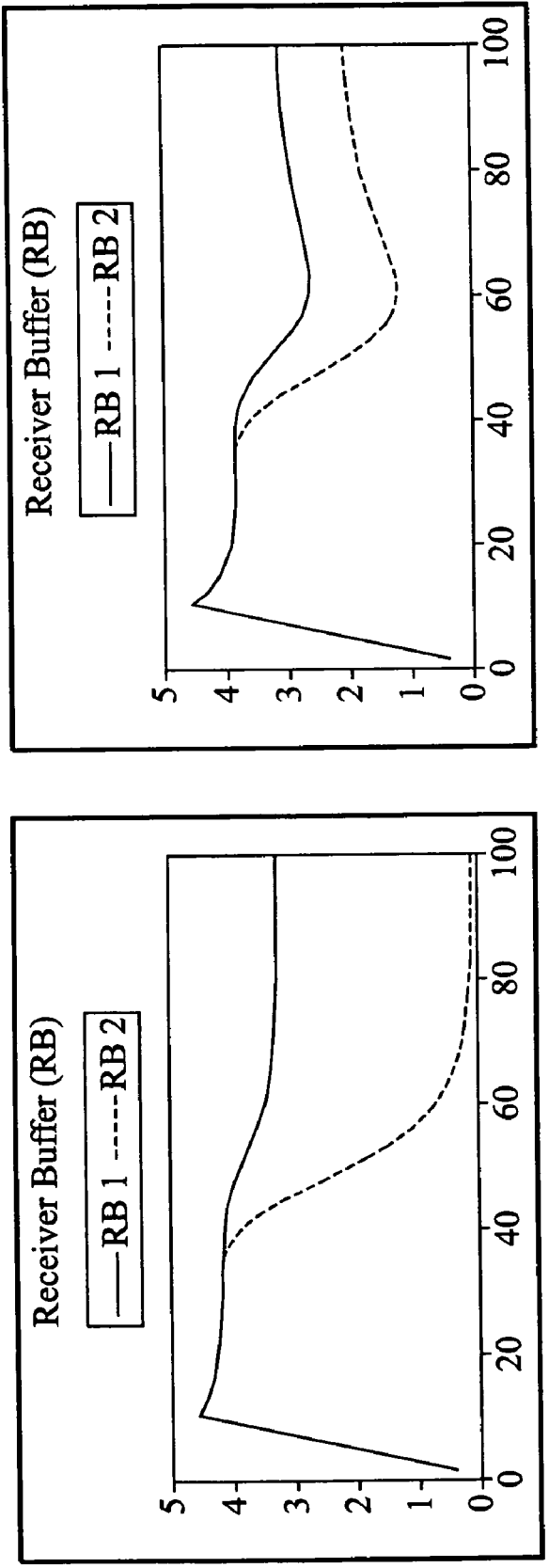

The performance of pro-active delay-constrained multi-stream rate adaptation is illustrated in FIGS. 3A-3B. The non-delay-constrained technique is on the left hand side, while the pro-active delay-constrained method is on the right. A simple scenario is presented where a single server transmits different video streams to 2 different clients over a shared channel. The available bandwidth is initially high (9 Mbps) for both connections, but at one point the available bandwidth for one of the connections drops off to a significantly lower level (4 Mbps). The available bandwidth for the 2 connections is plotted in the graph at the top. The channel allocation fractions and resulting bit rates for the 2 video streams are computed using the 3-parameter rate distortion model, i.e., using Eq. 7 and Eq. 8. For simplicity, the rate-distortion parameters of the 2 video bit streams are the same in this example, and the input bit rate is 10 Mbps.

The resulting video bit rates are plotted in the top graphs as well. In the steady states, the bit rates differ very little between the two methods. In both cases, the bit rates are reduced due to the bandwidth dropping, where the bit rate of the stream on the bad connection is reduced more than the bit rate of the stream on the good connection. However, note there are differences in bit rates during the transition from high to low bandwidth on the bad connection. The resulting backlog bit amounts (sender buffer fullness) for both cases are shown in the graphs in the middle. Using the prior-art technique (on the left), the backlog for the bad connection can be seen to increase significantly as the bandwidth drops. Using the pro-active delay-constrained technique (on the right), the backlog for the bad connection increases somewhat, but then returns to a new steady-state level. The resulting fullness of the receiver buffers at the clients is illustrated in the graphs at the bottom. Using the prior-art technique (on the left), the buffer level of the receiver using the bad connection can be seen to drop significantly (mirroring the increase in the sender buffer), to the point where the buffer is virtually depleted. In this scenario, any further bandwidth reduction is likely to result in buffer underflow in that receiver. Using the pro-active delay-constrained technique (on the right), the buffer level of both receivers initially drop somewhat as a result of the bandwidth drop, but then converge on a new steady state level (again mirroring the behavior at the sender side). This illustrates the advantage of the delay management feature of the proposed methods.

It is likewise to be understood that the techniques described herein are also likewise applicable to audio streams.

Flow Control Illustrations

Figure 4:
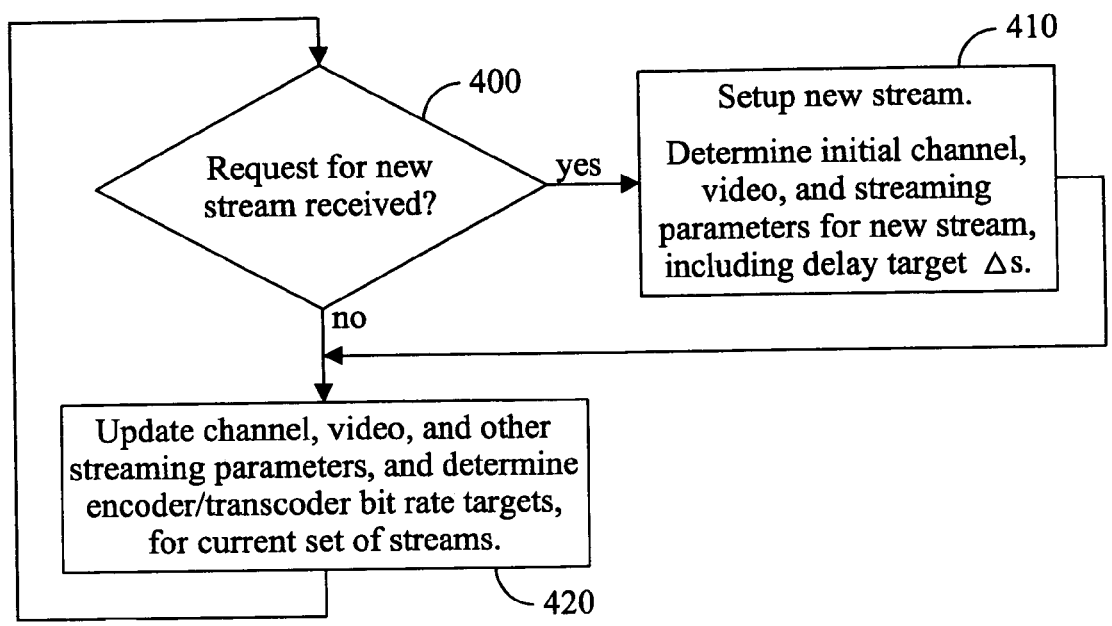
FIG. 4 illustrates a flow diagram for updating data for streams.

Referring to FIG. 4 an exemplary flow control for a system is illustrated. A determination 400 is made if a request for a new stream is received by the transmitter. If a new stream is requested, then a new stream is setup 410. The setup of the new stream may include, for example, determining the initial channel, video, and streaming parameters including the delay target Δs. Whether or not a new stream is requested 400, the system updates the channel, video, and other streaming parameters and determines encoder/transcoder bit rate targets for the current set of streams 420.

Figure 5A:
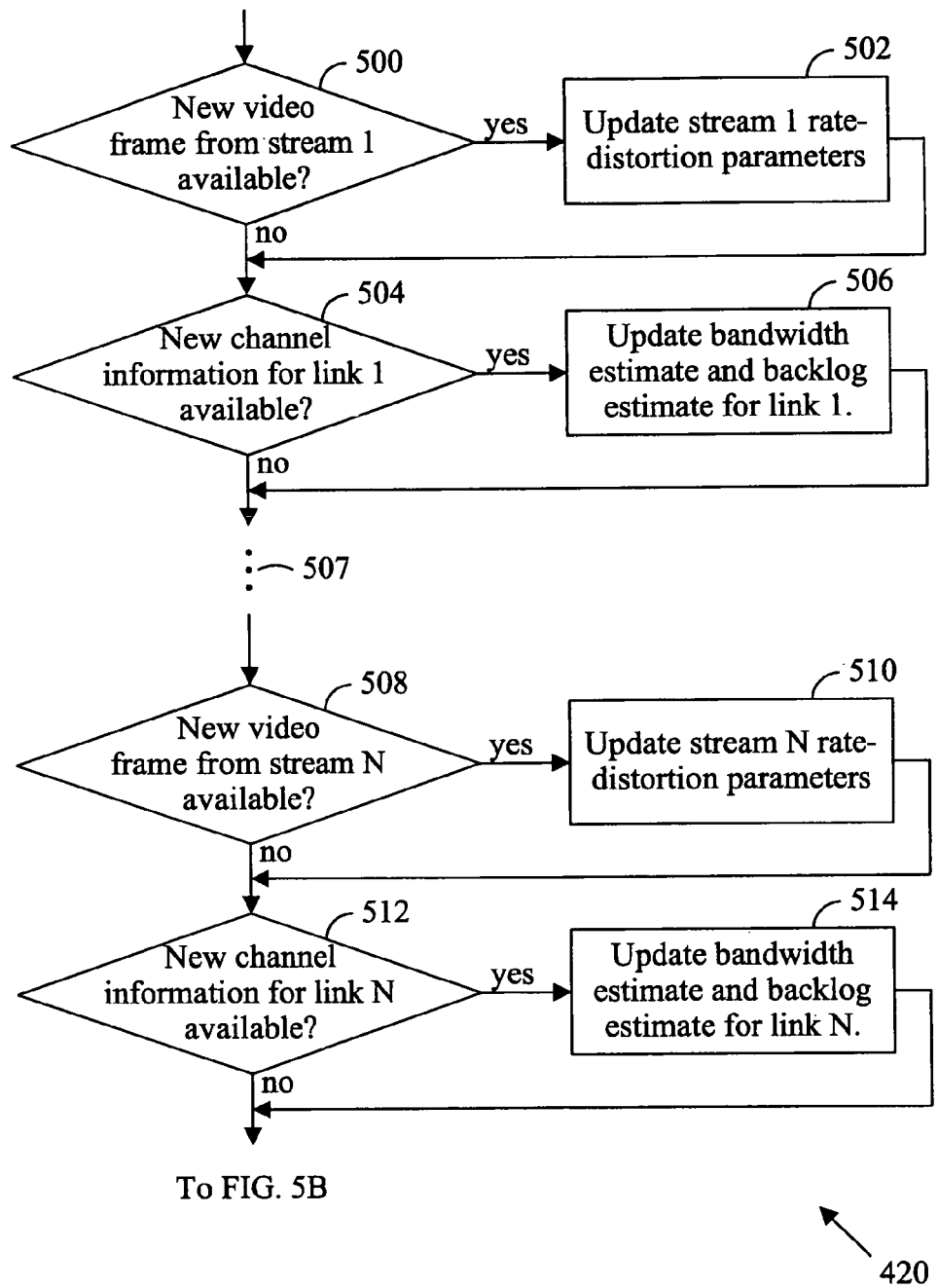
FIGS. 5A-5B illustrates a flow diagram for updating streaming parameters.
Figure 5B:
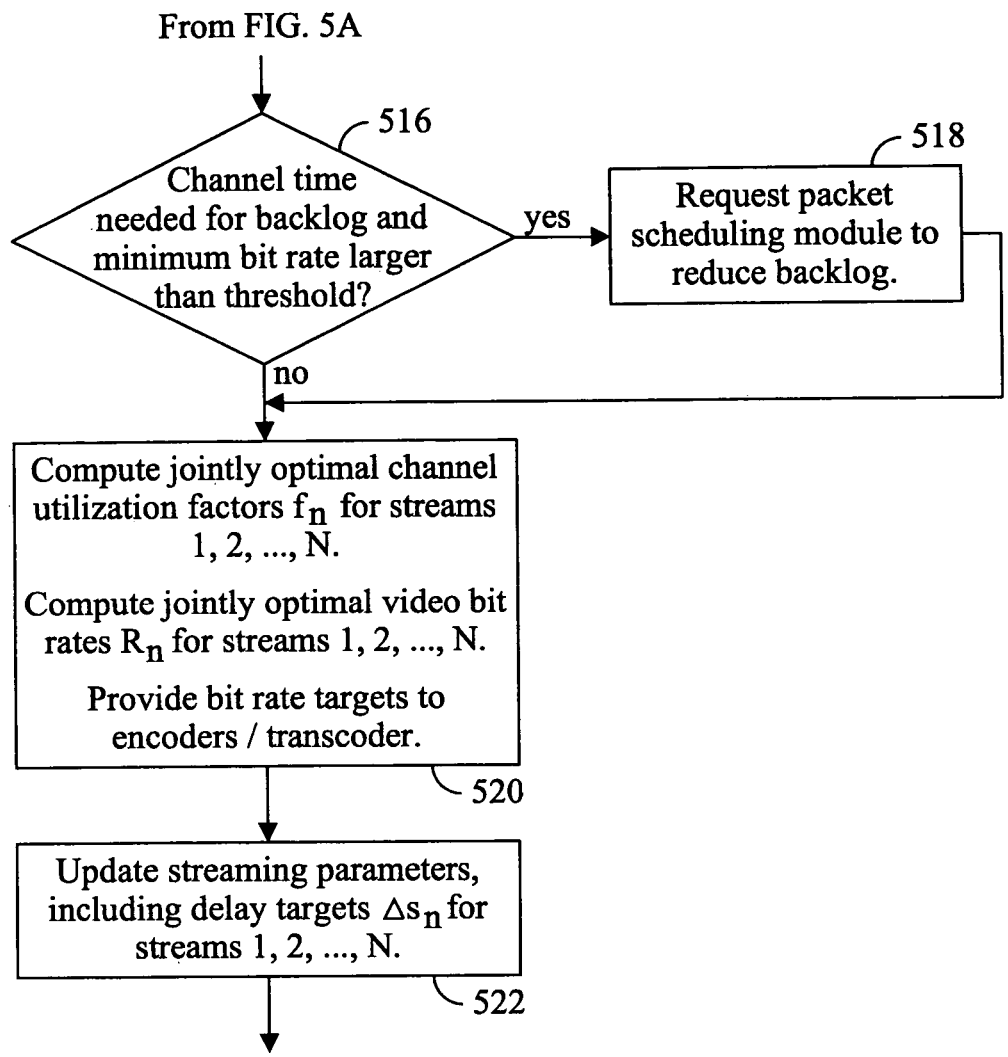

Referring to FIGS. 5A-5B, the updating 420 includes a series of steps. Initially the system checks 500 if a new frame is available for stream 1. If a new stream is available, then the system updates stream 1 rate distortion parameters 502. Next, the system checks 504 if new channel information is available for link 1. If new channel information is available, then the system updates the bandwidth estimate and backlog estimate for link 1 506. The system performs the same video frame and channel checks 507 for the remaining N−1. The system checks 508 if a new frame is available for stream N. If a new stream is available, then the system updates stream N rate distortion parameters 510. Next, the system checks 512 if new channel information is available for link N. If new channel information, then the system updates the bandwidth estimate and backlog estimate for link N 514. Thus in this manner, each of the N streams are updated on some sort of basis.

The system checks 516 whether the channel time needed for the existing backlog and given minimum bit rate is larger than a threshold. If the needed channel time exceeds the threshold, then the packet scheduling module is requested to reduce the backlog 518. Whether or not the packet scheduling module is invoked, the joint optimization of bit rates of all streams is performed 520, based on the most recent system status.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for transmitting data streams from a transmitter to a plurality of receivers over a shared channel comprising:

(a) a transmitter simultaneously transmitting a plurality of said data streams to said plurality of receivers over said shared channel subject to a joint delay constraint characterized by the equation $$\sum_{j=i}^{i+j-1} r_{n,i} = f_n \cdot H_n \cdot \Delta s_n - B_n \ n = 1, 2, \ldots, N.$$

where $r_{n,j}$ corresponds to the amount of bit used to encode frame j of stream n,
$f_n$ denotes the channel utilization factor,
$H_n$ denotes the expected bandwidth available for stream n,
$\Delta s_n$ denotes the time available until the target delivery time for stream n,
$B_n$ denotes the backlog for stream n,
and L denotes the number of video frames in the segment of video data (b) jointly and independently adapting the bit rates of the respective said data stream being transmitted in accordance with:
  (i) available bandwidths between the transmitter and respective said receivers;
  (ii) a general target time by which the data for respective said data streams should arrive at the respective said receivers;
  (iii) characteristics of respective said data streams relating respective bit rates to a quality measure by selectively varying at least one of:
    the respective channel utilization factors $f_n$ of the plurality of said data streams; and
    the respective target delivery times $\Delta s_n$ for the plurality of said data streams, by adjusting respective delay target factors $\Omega_n$ for the plurality of said data streams.

2. The method of claim 1 wherein said channel has a varying bandwidth.

3. The method of claim 1 wherein each of said data streams have a different bit rate.

4. The method of claim 1 wherein each of said data streams includes a video stream.

5. The method of claim 4 wherein said characteristics are based upon a 1 parameter rate distortion model.

6. The method of claim 5 wherein said joint adapting is based upon maximizing the minimum video quality across all video streams.

7. The method of claim 4 wherein said characteristics are based upon a 3 parameter rate distortion model.

8. The method of claim 7 wherein said joint adapting is based upon minimizing the average distortion over all video streams.

9. The method of claim 4 wherein said bit rates are adapted based upon optimizing a measure of the overall combined quality of said video streams.

10. The method of claim 1 wherein said adapting is based upon a delay-constrained rate adaptation.

11. The method of claim 1 wherein said adapting takes into account data stored in a buffer or queue at said transmitter.

12. The method of claim 1 wherein said adapting takes into account data stored in a buffer or queue at said receiver.

13. The method of claim 1 wherein said transmitter multiplexes said data streams into said shared channel.

14. The method of claim 1 wherein said adapting takes into account data stored in a buffer or queue for each data stream at the transmitter.

15. The method of claim 1 wherein said adapting includes a model substantially ensuring on-time delivery while substantially avoiding buffer underflow at said receivers.

16. The method of claim 1 wherein said adapting relates an error distortion of one of said data streams to the data rate of said one of said data streams.

17. The method of claim 1 wherein said adapting selectively uses a multi-stream packet scheduler.

18. The method of claim 17 wherein said packet scheduler is invoked when a threshold on the overall channel utilization may be exceeded.

19. The method of claim 1 wherein said adapting selectively removes packets being held in a transmission buffer.

20. The method of claim 1 wherein said available bandwidth between said transmitter and said plurality of receivers are different.

21. The method of claim 1 wherein a different general target time is associated with each said respective data stream.

* * * * *

UNITED STATES PATENT AND TRADEMARK OFFICE
CERTIFICATE OF CORRECTION

PATENT NO. : 7,652,993 B2  Page 1 of 1
APPLICATION NO. : 11/592906
DATED : January 26, 2010
INVENTOR(S) : Petrus J. L. van Beek It is certified that error appears in the above-identified patent and that said Letters Patent is hereby corrected as shown below:

Col. 4, Line 19

Change "be may determined" to read --may be determined--.

Col. 10, Lines 36-38

Change

" $$\sum_{j=i}^{i+j-1} r_{n,i} = f_n \cdot H_n \cdot \Delta s_n - B_n \qquad n = 1,2,\dots,N.$$ "

to read:

-- $$\sum_{j=i}^{i+L-1} r_{n,j} = f_n \cdot H_n \cdot \Delta s_n - B_n \qquad n = 1,2,\dots,N.$$ --.

Col. 10, Line 46

Change "$\Delta S_n$" to read -- $\Delta s_n$ --.

Col. 10, Line 66

Change "$\Omega_n$" to read -- $\Omega n$ --.

Signed and Sealed this

Thirty-first Day of August, 2010

David J. Kappos
*Director of the United States Patent and Trademark Office*